US012602435B1

(12) United States Patent　　(10) Patent No.:　US 12,602,435 B1
Liu et al.　　　　　　　　　　　　(45) Date of Patent:　　Apr. 14, 2026

(54) PROVIDING CUSTOMIZED SERVICES TO USERS OF DATA PROCESSING SYSTEMS

(71) Applicant: Dell Products L.P., Round Rock, TX (US)

(72) Inventors: Tsehsin Jason Liu, Wellesley, MA (US); Amihai Savir, Newton, MA (US); Ofir Ezrielev, Be'er Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/962,807

(22) Filed: Nov. 27, 2024

(51) Int. Cl.
　　*G06F 16/903*　　　　(2019.01)
(52) U.S. Cl.
　　CPC .............................. *G06F 16/90335* (2019.01)
(58) Field of Classification Search
　　None
　　See application file for complete search history.

(56) References Cited

U.S. PATENT DOCUMENTS

| | | | |
|---|---|---|---|
| 12,406,013 B1 * | 9/2025 | Nadig | ..................... G10L 15/22 |
| 2005/0060417 A1 | 3/2005 | Rose | |
| 2009/0276419 A1 * | 11/2009 | Jones | ................... G06F 16/332 |
| | | | 707/999.005 |
| 2016/0378941 A1 | 12/2016 | Pastuszak | |
| 2018/0052925 A1 * | 2/2018 | Cohn | ................... G06F 16/951 |
| 2020/0192928 A1 | 6/2020 | Arar | |
| 2020/0218770 A1 * | 7/2020 | Tu | ........................ G06F 16/953 |

| | | |
|---|---|---|
| 2020/0272664 A1 | 8/2020 | Aggour |
| 2021/0182709 A1 | 6/2021 | Manchanda |
| 2024/0029262 A1 | 1/2024 | Ezrielev |
| 2024/0143545 A1 | 5/2024 | Brenner |
| 2025/0111246 A1 | 4/2025 | Casini |
| 2025/0117412 A1 | 4/2025 | Jalagam |
| 2025/0118417 A1 | 4/2025 | Chong |
| 2025/0342168 A1 | 11/2025 | Masih |

FOREIGN PATENT DOCUMENTS

WO　　　　2024015321 A1　　　1/2024

OTHER PUBLICATIONS

Guo, Xudong, et al. "Embodied llm agents learn to cooperate in organized teams." arXiv preprint arXiv:2403.12482 (2024).

(Continued)

*Primary Examiner* — Richard L Bowen
(74) *Attorney, Agent, or Firm* — WOMBLE BOND DICKINSON (US) LLP

(57)　　　　　　　ABSTRACT

Methods and systems for providing customized services to users of data processing systems are disclosed. To provide the customized services, a query may be obtained from a user. Contextual information for the query may be attempted to be obtained from a first data source associated with the user. If at least a first portion of the contextual information is unable to be obtained from the first data source, at least one other user may be identified based on the user. A second data source may be identified that is associated with the at least one other user. The at least the first portion of the contextual information may be attempted to be obtained from the second data source. The query may be serviced using at least the first portion of the contextual information and any other information obtained from the first data source.

20 Claims, 6 Drawing Sheets

(56)                 References Cited

OTHER PUBLICATIONS

Sinha, Pallavi, "Understanding LLM-Based Agents and their Multi-Agent Architecture," Medium, May 1, 2024, Web Page <https://medium.com/@pallavisinha12/understanding-llm-based-agents-and-their-multi-agent-architecture-299cf54ebae4> accessed on Nov. 26, 2024.
Liu, Jiawen, et al. "PeerGPT: Probing the Roles of LLM-based Peer Agents as Team Moderators and Participants in Children's Collaborative Learning." Extended Abstracts of the CHI Conference on Human Factors in Computing Systems. 2024.
Chuang, Yun-Shiuan, et al. "Beyond demographics: aligning role-playing LLM-based agents using human belief networks." arXiv preprint arXiv:2406.17232 (2024).
Wang, Lei, et al. "A survey on large language model based autonomous agents." Frontiers of Computer Science 18.6 (2024): 186345.
Zong, Chang, et al. "Triad: A Framework Leveraging a Multi-Role LLM-based Agent to Solve Knowledge Base Question Answering." arXiv preprint arXiv:2402.14320 (2024).
Cheng, Yuheng, et al. "Exploring large language model based intelligent agents: Definitions, methods, and prospects." arXiv preprint arXiv:2401.03428 (2024).
"Azure Storage redundancy," Microsoft, Jan. 19, 2024, Web Page <https://learn.microsoft.com/en-us/azure/storage/common/storage-redundancy> accessed on Nov. 26, 2024.

Chen, Jou-An, et al. "Survey: Exploiting data redundancy for optimization of deep learning." ACM Computing Surveys 55.10 (2023): 1-38.
Mayr, Philipp, and Vivien Petras. "Cross-concordances: terminology mapping and its effectiveness for information retrieval." arXiv preprint arXiv:0806.3765 (2008).
Mayr, Philipp, and Vivien Petras. "Building a Terminology Network for Search: The KoMoHe Project." Dublin Core Conference. 2008.
Schlangen, David. "LLMs as Function Approximators: Terminology, Taxonomy, and Questions for Evaluation." arXiv preprint arXiv:2407.13744 (2024).
Purpura, Alberto, et al. "Automatic Mapping of Terminology Items with Transformers." AMIA Annual Symposium Proceedings. vol. 2023. American Medical Informatics Association, 2023.
Zhang, Zhang, et al. "Intention recognition for multiple agents." Information Sciences 628 (2023): 360-376.
Besta, Maciej, et al. "Graph of thoughts: Solving elaborate problems with large language models." Proceedings of the AAAI Conference on Artificial Intelligence. vol. 38. No. 16. 2024.
"Record desktop flows," Microsoft, Feb. 23, 2023, Web Page <https://learn.microsoft.com/en-us/power-automate/desktop-flows/recording-flow> accessed on Nov. 26, 2024.
Xi, Zhiheng, et al. "The rise and potential of large language model based agents: A survey." arXiv preprint arXiv:2309.07864 (2023).

* cited by examiner

PROVIDING CUSTOMIZED SERVICES TO USERS OF DATA PROCESSING SYSTEMS

FIELD

Embodiments disclosed herein relate generally to providing customized services to users of data processing systems. More particularly, embodiments disclosed herein relate to systems and methods to provide customized services to users of data processing systems by managing user queries.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
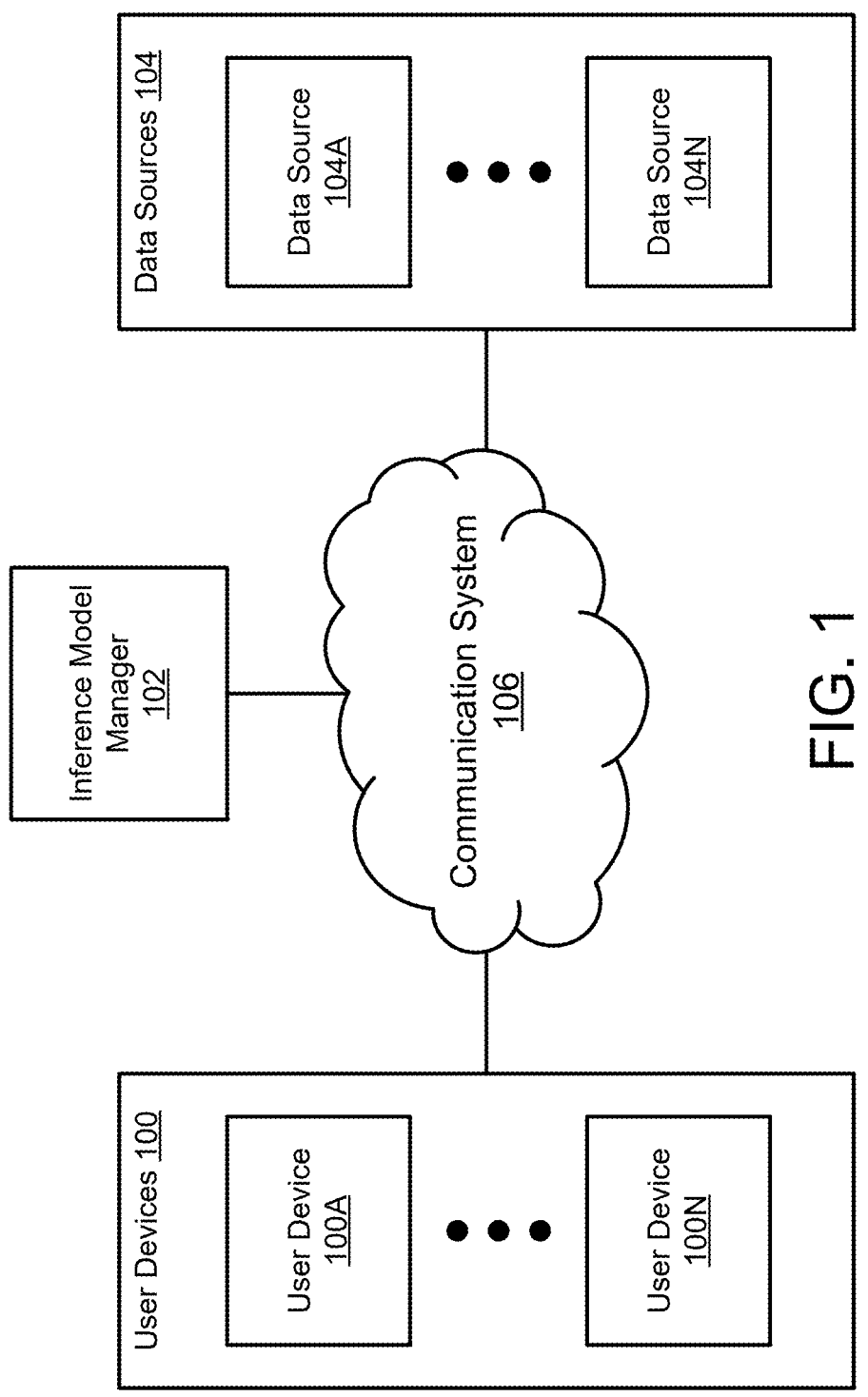
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer-implemented services to users of data processing systems. To provide the computer-implemented services, data may be obtained from any number of distributed data sources (e.g., various databases and/or other storage architectures). The data may be obtained via performing searches across the distributed data sources, which may consume an undesirable amount of resources (e.g., cognitive resources of the users, time resources, computational resources).

To reduce a resource consumption for obtaining the data, the users may obtain the data using inference models. The inference models may include generative artificial intelligence (AI) models such as large language models (LLMs) and may be trained to generate responses when provided with queries from the users. The responses may include the data usable to provide the computer-implemented services.

However, the responses generated by the inference models may not meet the expectations of the users. For example, a response may not meet the expectations of a user due to an inability of the user to generate a query in a manner that allows an inference model to generate a desired response (e.g., the query may be ambiguous, lack context, and/or otherwise fail to obtain the desired response from the inference model). In another example, an inference model may be trained using an insufficient quantity of training data. Due to the insufficient quantity of training data, the inference model may require complex and/or specific queries in order to generate a desired response. Therefore, the responses may by of a reduced quality which may result in cessation of and/or a reduction in quality of the computer-implemented services provided, at least in part, using the responses.

To provide responses to users of data processing systems that meet the expectations of the users while conserving resources, contextual information for queries obtained from the users may be obtained from data sources associated with the users and/or from other data sources associated with other users. To do so, a first personal agent may be assigned to a user and, upon obtaining a query from the user, the first personal agent may attempt to obtain the contextual information for the query from a first data source (e.g., a first retrieval-augmented generation (RAG) repository) associated with the user. If at least a first portion of the contextual information is unable to be obtained from the first data source, the first personal agent may identify at least one other user based on the user (e.g., by performing a user matching process to compare first characteristics for the user to characteristics for other users). A second data source (e.g., a second RAG repository) may be identified based on the at least one other user, and the second data source may be managed by a second personal agent.

To attempt to obtain the at least the first portion of the contextual information from the second data source, the first personal agent may initiate interactions with the second personal agent. If the at least the first portion of the contextual information is unable to be obtained from the second data source, the query may be provided to a second user that is likely to have a knowledge base usable to service the query.

If the at least the first portion of the contextual information is able to be obtained from the second data source, the query may be serviced by generating an ingest data package for the inference model. The ingest data package may include: (i) the at least the first portion of the contextual information, (ii) any other information obtained from the first data source while attempting to obtain the contextual information, and/or (iii) the query. The ingest data package may then be used to initiate generation of a response to the query by an inference model, and the response may be provided to the user as a customized service.

Thus, embodiments disclosed herein may address, among other technical problems, the technical challenge of providing information to users of data processing systems while conserving resources. To provide the information to the users, contextual information for queries from the users may be obtained from data sources associated with the users and data sources associated with other users selected based on the users. The contextual information may then be used as context by an inference model to generate responses to the queries including the information. By doing so, a likelihood of providing the information to the users as desired may be improved. By utilizing inference models to provide the information to the users, a resource expenditure of obtaining the information may be reduced.

In an embodiment, a method for providing customized services to users of data processing systems is disclosed. The method may include: obtaining a query from a user of the users; attempting, based on the query, to obtain contextual information for the query from a first data source associated with the user, the first data source including first content ascribed a predetermined level of importance by the user; in a first instance of the attempting where at least a first portion of the contextual information is unable to be obtained from the first data source: identifying at least one other user based on the user; identifying a second data source associated with the at least one other user, the second data source including second content ascribed the predetermined level of importance by the at least one other user; attempting, based on the at least the first portion of the contextual information, to obtain the at least the first portion of the contextual information for the query from the second data source; and servicing the query using the at least the first portion of the contextual information and any other information obtained from the first data source during the attempting to obtain the contextual information for the query from the first data source.

Attempting to obtain the contextual information for the query from the first data source may include: comparing information obtained from the first data source to criteria, the criteria including a level of enhancement threshold to allow the query to be serviced in a manner that is acceptable to the user; in a first instance of the comparing in which the information meets the criteria: concluding that the contextual information is able to be obtained from the first data source; servicing the query using the contextual information; and in a second instance of the comparing in which the information does not meet the criteria: concluding that the at least the first portion of the contextual information is unable to be obtained from the first data source.

Identifying the at least one other user based on the user may include: obtaining first characteristics for the user; and performing, using the first characteristics and similarity criteria, a user matching process to identify the at least one other user, the at least one other user having second characteristics that meet the similarity criteria.

The first characteristics may include at least one type of characteristic selected from a list of types of characteristics consisting of: a job title for the user; job duties for the user; a job division for the user; and a job ranking for the user.

The first data source may be managed by a first personal agent assigned to the user, and the second data source may be managed by a second personal agent assigned to the at least one other user.

Attempting to obtain the at least the first portion of the contextual information for the query from the second data source may include: initiating interactions, by the first personal agent, with the second personal agent to attempt to obtain the at least the first portion of the contextual information; and in an instance of the attempting to obtain the at least the first portion of the contextual information for the query from the second data source in which the at least the first portion of the contextual information is unable to be obtained from the second data source: proving the query to a second user that is likely to have a knowledge base usable to service the query.

Servicing the query may include: obtaining, using the query, the at least the first portion of the contextual information, and the any other information, an ingest data package for an inference model; initiating generation of a response by the inference model using the ingest data package; and providing the response to the user as a customized service.

The ingest data package may be a retrieval-augmented generation (RAG) output from a RAG pipeline process, and the inference model may be a large language model (LLM).

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide, at least in part, computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided by, for example, user devices 100, inference model manager 102, data sources 104, and/or any other type of devices (not shown in FIG. 1). Other types of computer-implemented services may be provided by the system shown in FIG. 1 without departing from embodiments disclosed herein.

Information obtained from data sources 104 may be used, at least in part, to provide the computer-implemented services. For example, a user of user device 100A may be a salesperson that analyzes market trends for a company. In order to analyze the market trends, the salesperson may use information such as historical sales data for the company, sales data from other companies, regional and/or global market data, forecasted market data, etc.

The information used by the user may be stored in any number of distributed data sources of data sources 104. For example, the information used by the salesperson may be stored in various databases and/or other data repositories. Searching for the information across the distributed data sources may consume an undesirable amount of resources, such as time resources, cognitive resources of the user, and computing resources.

In order to improve an efficiency of obtaining the information and decrease resource consumption, the user may use an inference model to obtain the information. The inference model may include a generative artificial intelligence (AI) model such as a large language model (LLM). The inference model may be trained to generate responses when provided with a query (e.g., ingest data). The responses may include the information and may be provided as part of the computer-implemented services. For example, the salesperson may provide a query to the inference model indicating a desired information content (e.g., the query may include the text "global sales last quarter"), and the salesperson may obtain a response to the query from the inference model.

However, responses generated by the inference model may not meet expectations of the user (e.g., the responses may not include the desired information content, the responses may not be accurate). For example, the responses may not meet the expectations of the user due to an inability of the user to generate queries in a manner that allows the inference model to generate desired responses. For example, the salesperson may lack training and/or experience using inference models; as a result, queries provided to the inference model by the salesperson may be ambiguous, lack context, and/or otherwise fail to obtain a response from the inference model that meets the expectations of the salesperson. In another example, an inference model may be trained using an insufficient quantity of training data. Due to the insufficient quantity of training data, the inference model may require complex and/or specific queries in order to generate desired responses. Consequently, the user may be unable to obtain desired responses, and the computer-implemented services provided, at least in part, based on the responses may be negatively impacted.

In general, embodiments disclosed herein may provide methods, systems, and/or devices for providing customized services to users of data processing systems in a manner that meets the expectations of the users while conserving resources. To provide the customized services, a query may be obtained from a user. In order to obtain a response to the query that meets the expectations of the user, contextual information may be provided, in addition to the query, as ingest to an inference model to be used to generate the response. The contextual information may be obtained from a first data source (e.g., a first RAG repository) associated with the user. However, if at least a first portion of the contextual information is unable to be obtained from the first data source, the at least the first portion of the contextual information may be obtained from other data sources.

To attempt to obtain the at least the first portion of the contextual information from other data sources, at least one other user may be identified based on the user (e.g., via a user matching process using user characteristics such as a job tile for the user, job duties for the user, etc.). A second data source (e.g., a second RAG repository) may then be identified that is associated with the at least one other user, and the at least the first portion of the contextual information may be attempted to be obtained from the second data source. If the at least the first portion of the contextual information is able to be obtained from the second data source, the query may be serviced (e.g., a response to the query may be generated by the inference model) using the at least the first portion of the contextual information and any other relevant information obtained from the first data source. The response may be provided to the user as a customized service.

By doing so, a response to a query obtained from a user of a data processing system may have an increased likelihood of meeting the expectations of the user. By obtaining contextual information for the query from a data source associated with the user and/or data sources associated with other users selected based on the user, relevant information may be provided to an inference model to be used as context for generating the response. In doing so, computer-implemented services may be provided for the user based on the response in a desired manner while reducing a resource cost associated with manually searching for information and/or providing the inference model queries that are unable to be used to obtain desired responses.

To provide the above noted functionality, the system of FIG. 1 may include user devices 100, inference model manager 102, data sources 104, and communication system 106. Each of these components is discussed below.

User devices 100 may provide and/or consume all, or a portion of, the computer-implemented services. User devices 100 may include any number of user devices (e.g., 100A-100N), that may be used by businesses, individuals, and/or other users. User devices 100 may include data processing systems including any number of hardware and/or software components configured to provide the computer-implemented services. While providing the computer-implemented services, user devices 100 may obtain responses from inference models and/or other information based on the responses to facilitate provisioning of the computer-implemented services.

To obtain the responses, user devices 100 may host personal agents (e.g., a software program) and/or may communicate with personal agents hosted by a remote entity (not shown). The personal agents may each be assigned to a user of user devices 100, and may interact with the users, other personal agents, and/or inference model manager 102 to facilitate provision of the computer-implemented services. To perform their functionality, the personal agents may: (i) store files, emails, documents, and/or other types of data ascribed predetermined levels of importance by the users (e.g., based on any criteria and/or schema for assigning levels of importance) in data sources 104, (ii) obtain queries (e.g., from their assigned users), (iii) obtain contextual information for the queries (e.g., from data sources 104, from other personal agents), (iv) obtain, using the contextual information and the queries, ingest data packages for the inference models (e.g., generate the ingest data packages), (v) provide the ingest data packages to inference model manager 102 (e.g., to be used as input for generating responses), (vi) receive responses to the queries from inference model manager 102, and/or (vii) perform other tasks.

The personal agents may obtain the contextual information for the queries from data sources 104 and/or from other personal agents. Data sources 104 may include any type and/or number of data sources (e.g., 104A-104N). Each data source of data sources 104 may include hardware and/or software components configured to obtain data, store data, provide data to other entities, and/or to perform any other task to facilitate performance of the computer-implemented services. All, or a portion, of data sources 104 may provide (and/or participate in and/or support the) computer-implemented services to various devices operably connected to data sources 104. Different data sources may provide similar and/or different computer-implemented services.

Data sources 104 may include RAG repositories, and may provide data to (e.g., allow access to data by) the personal agents. Data sources 104 may be organized so that each data source of data sources 104 (e.g., each RAG repository) is associated with a user of user devices 100, and a personal agent assigned to a user may be allowed to store, modify, and/or access the data in a data source associated with the user. For example, data source 104A may be associated with a user of user device 100A, and thus, the personal agent assigned to the user of user device 100A may be allowed access to data source 104A. Refer to the description of FIG. 2A for additional details regarding the data sources.

To obtain the contextual information for the queries, the personal agents may first attempt to obtain the contextual information from data sources associated with their assigned users. If at least a first portion of the contextual information is unable to be obtained, the personal agents may initiate interactions with other personal agents to attempt to obtain the at least the first portion of the contextual information from other data sources of data sources 104. The other data sources used to attempt to obtain the at least the first portion of the contextual information may be selected based on characteristics of users associated with the other data sources.

For example, a first personal agent hosted by user device 100A may obtain a query from the user of user device 100A. Upon obtaining the query, the first personal agent may attempt to obtain the contextual information for the query from data source 104A (e.g., a RAG repository associated with the user). If the first personal agent is unable to obtain at least a first portion of the contextual information from data source 104A, the first personal agent may obtain (e.g., as input from the user, from a database and/or other storage architecture) first characteristics for the user. Using the first characteristics the first personal agent may perform a user matching process to identify other data sources associated with users having similar characteristics to the first characteristics (e.g., based on similarity criteria). For example, the first personal agent may determine that a second user associated with data source 104B has second characteristics that meet the similarity criteria. The first personal agent may then initiate interactions with a second personal agent (e.g., assigned to the second user), which may include requesting the at least the first portion of the contextual information from data source 104B. In response, the second personal agent may provide the requested information to the first personal agent. Refer to the description of FIG. 2B for additional details regarding obtaining the at least the first portion of the contextual information.

Upon obtaining sufficient contextual information for the queries (e.g., based on any criteria for an amount of information needed to generate responses as desired by the users), the personal agents may obtain ingest data packages for the inference models, which may include any relevant contextual information for the query (e.g., from data sources associated with their assigned users, from other personal agents) and/or the query. The ingest data packages may be obtained as part of performing a retrieval-augmented generation (RAG) pipeline process.

The ingest data packages may be provided to inference model manager 102. Inference model manager 102 may perform tasks relating to management of and/or facilitation of use of inference models. Inference model manager 102 may include any number and/or type of devices (e.g., other data processing systems, servers, storage devices, user devices) that may be used to manage the inference models. As part of managing the inference models, inference model manager 102 may train and/or host any number and/or type of inference models trained to generate responses (e.g., inferences) to queries. The inference models may include generative artificial intelligence (AI) inference models (e.g., large language models (LLMs)); therefore, the responses may include new instances of data created by the generative AI inference models based on learned associations established during inference model training. For example, the inference models may be trained using unstructured data, such as stories, essays, audio transcription, video description, and/or other types of human interpretable text, to generate responses of the same. The ingest data packages provided to inference model manager 102 by the personal agents hosted by user devices 100 may be used as input data for the inference models managed by inference model manager 102.

To perform its functionality, inference model manager 102 may: (i) manage (e.g., facilitate) training processes for the inference models (e.g., LLMs, other types of inference models), (ii) obtain ingest data packages, (iii) use the ingest data packages to initiate generation of responses to the queries using the ingest data packages as input (e.g., by feeding the ingest data packages to the inference models and obtaining the responses as output from the inference models), (iv) provide the responses to user devices 100 as customized services, and/or (v) perform other tasks. The responses may be generated by the inference models using the contextual information provided as part of the ingest data packages as context for the responses.

Thus, personal agents assigned to users of user devices 100 may facilitate obtaining responses to queries from the users. To do so, the personal agents may first attempt to obtain contextual information for the queries from a data source of data sources 104 associated with their assigned users. If at least a first portion of the contextual information is unable to be obtained, the personal agents may interact with other personal agents to obtain the at least the first portion of the contextual information from other data sources of data sources 104. Any information identified as relevant contextual information may be provided as part of an ingest data package to inference models managed by inference model manager 102. By doing so, a likelihood of obtaining responses to the queries in a manner that meets the expectations of the users may be increased.

Figure 2A:
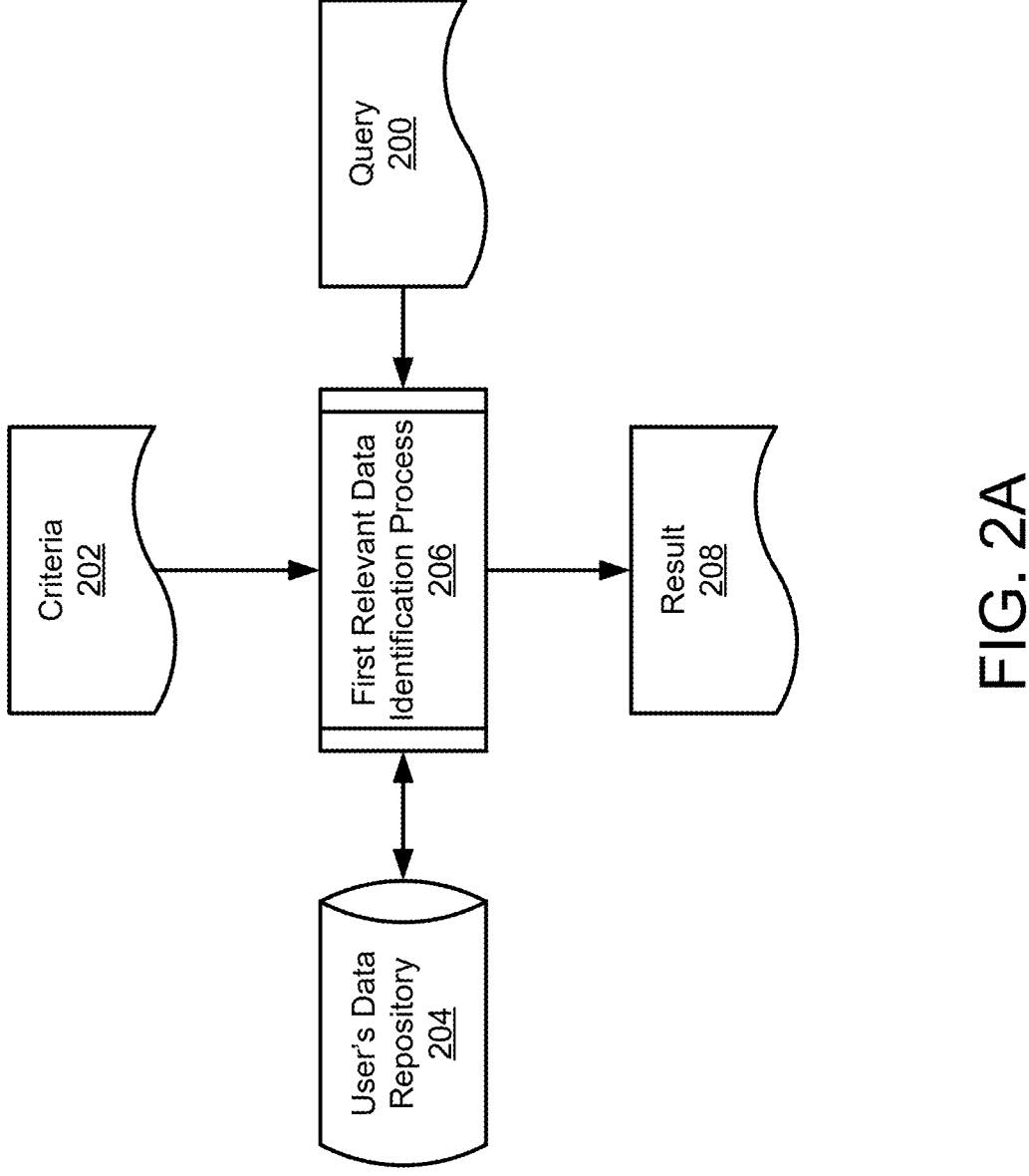
FIGS. 2A-2C show diagrams illustrating data flows in accordance with an embodiment.
Figure 2B:
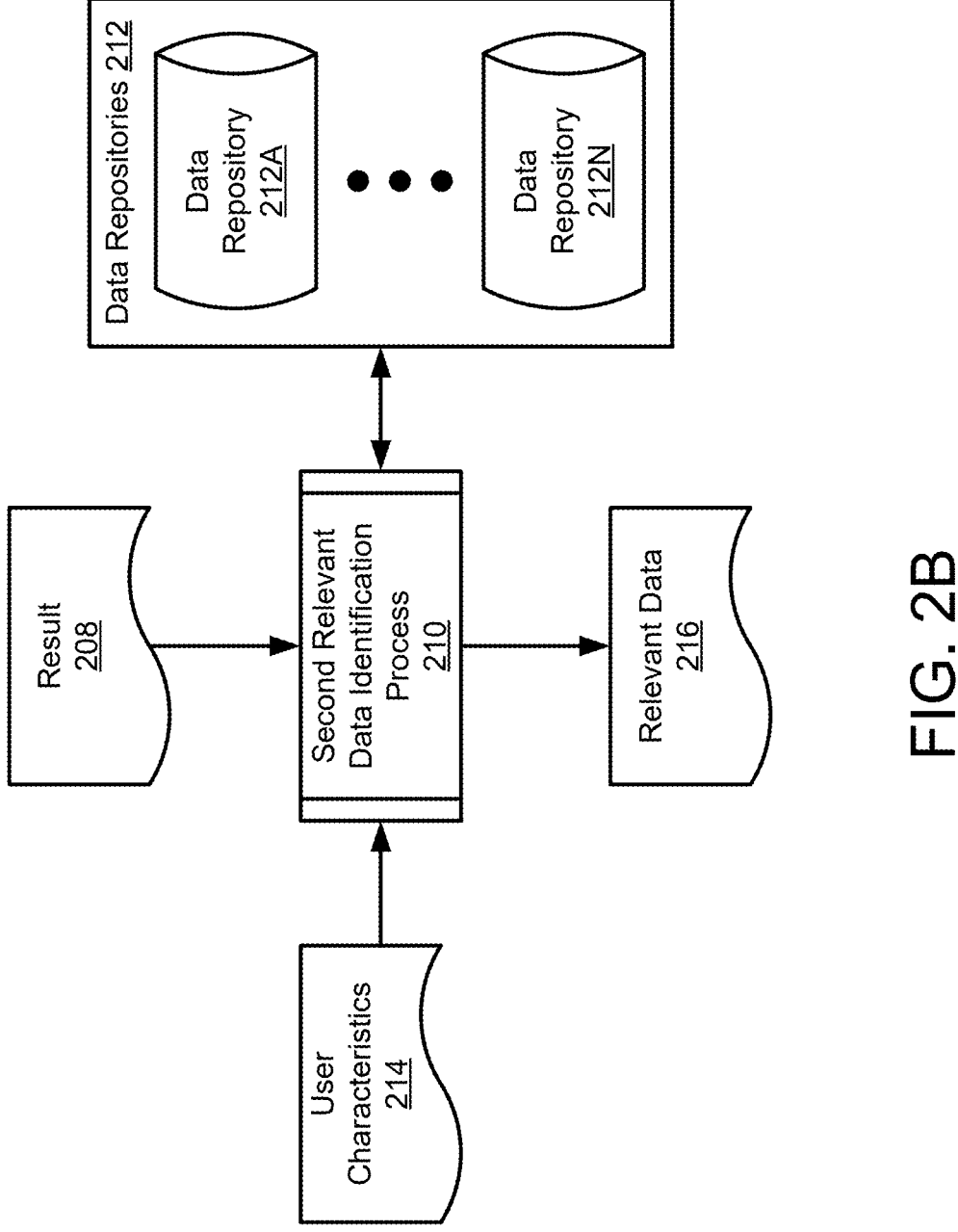
Figure 2C:
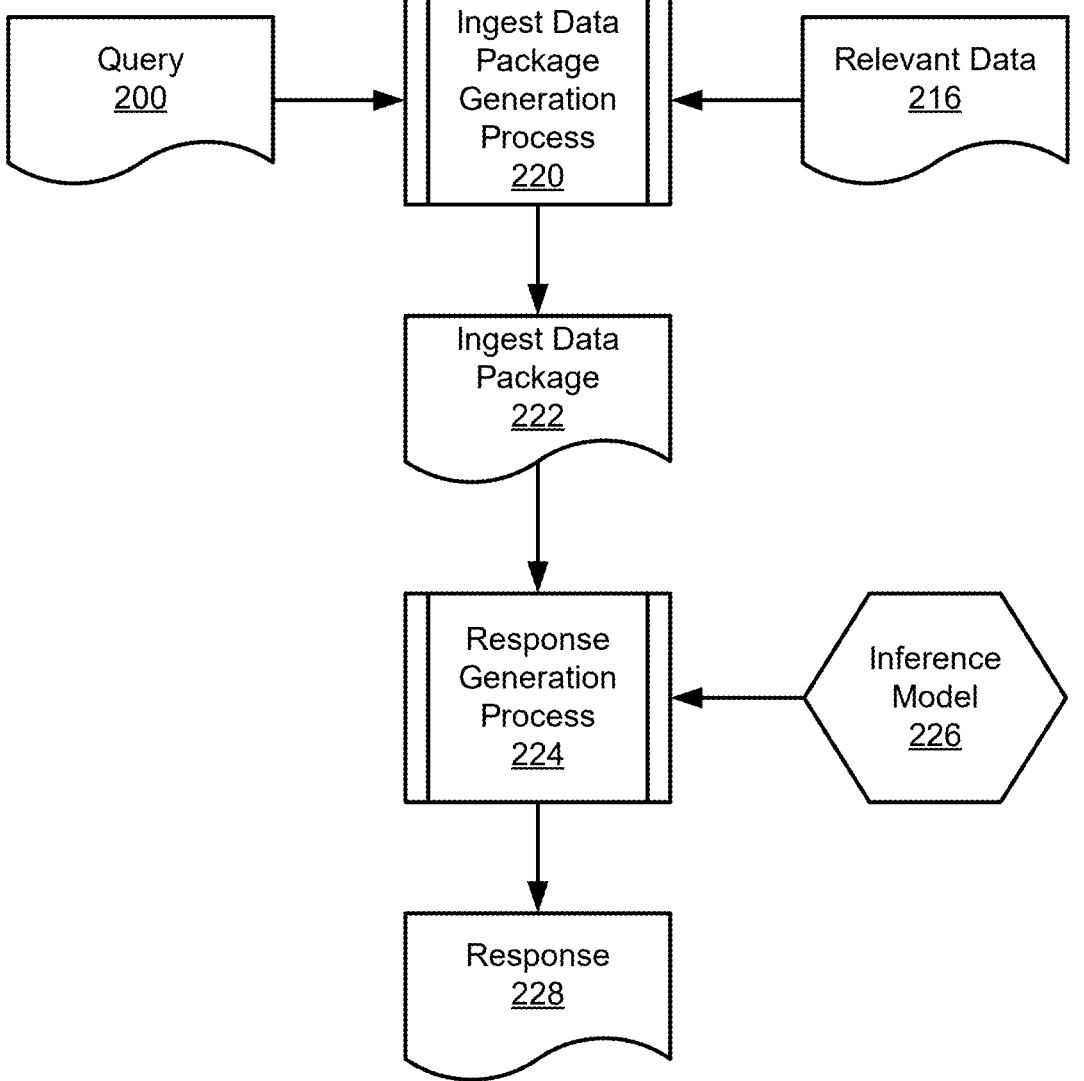
Figure 3:
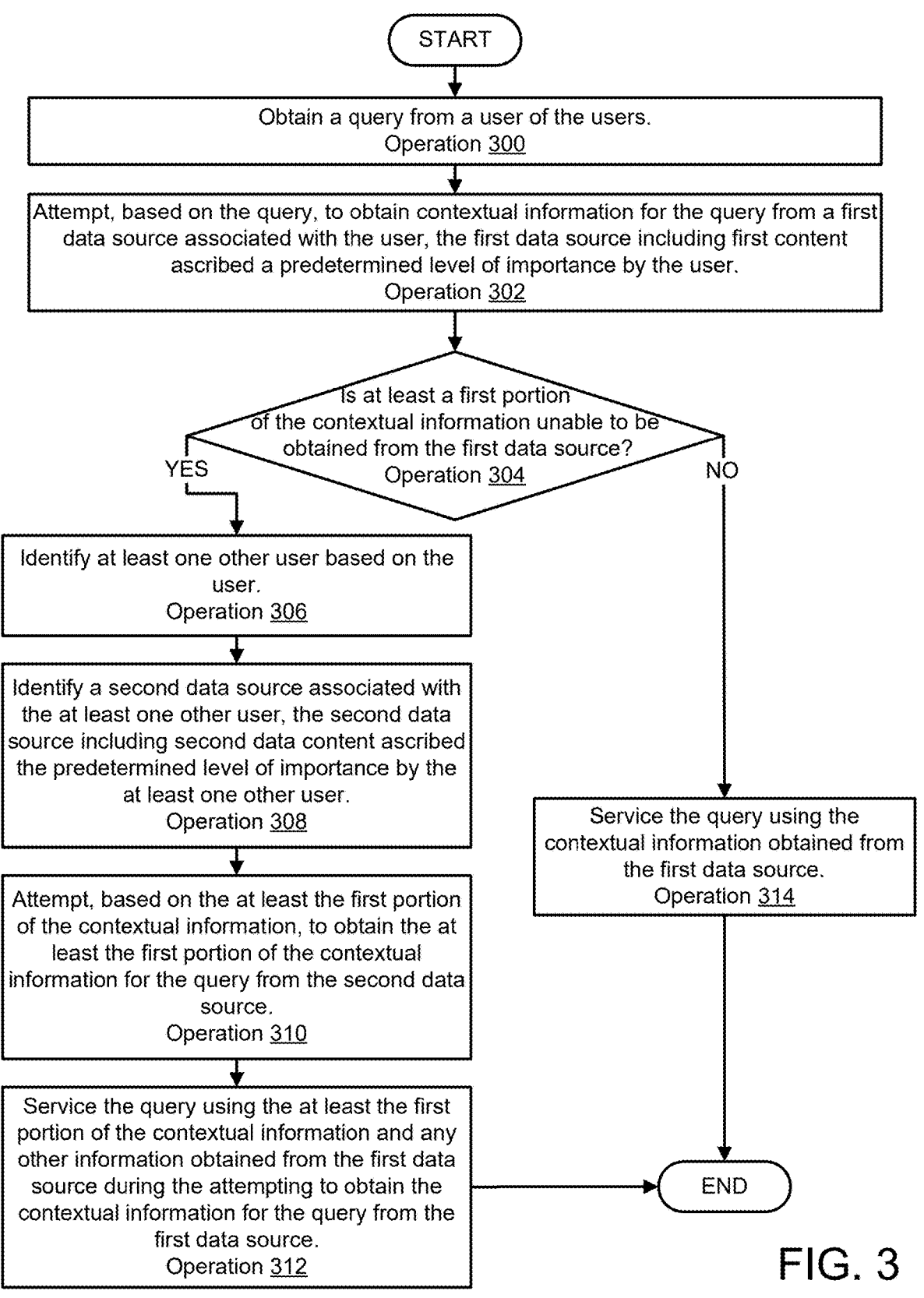
FIG. 3 shows a flow diagram illustrating a method for providing customized services to users of data processing systems in accordance with an embodiment.

When providing their functionality, any of (and/or components thereof) user devices 100, inference model manager 102, and/or data sources 104 may perform all, or a portion, of the actions and methods illustrated in FIGS. 2A-3.

Any of (and/or components thereof) user devices 100, inference model manager 102, and data sources 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 202, etc.) is used to represent data structures, a second set of shapes (e.g., 206, 210, etc.) is used to represent processes performed using and/or that generate data, a third set of shapes (e.g., 204, 212A) is used to represent large scale data structures such as databases, and a fourth set of shapes (e.g., 226) is used to represent inference models.

Turning to FIG. 2A, a first data flow diagram in accordance with an embodiment is shown. The first data flow diagram may illustrate data used in and data processing performed in attempting to obtain contextual information for a query from a user (e.g., query 200) from a first data source associated with the user (e.g., user's data repository 204).

To do so, query 200 may be obtained from the user. For example, query 200 may be obtained by a first personal agent assigned to the user (e.g., via a message over a communication system from the user, via input by the user using a graphical user interface (GUI) on the user's device).

Query 200 may include a prompt (e.g., a question, a request for a desired information content and/or other information) to be used as a guide and/or instructions by an inference model (e.g., an LLM) to generate a response. For example, an employee of a company may use an LLM to generate a summary of past sales for the company based on query 200 (e.g., the desired information content). In this example, query 200 may include the text "summarize sales for last quarter" which may be used by the LLM to generate an output (e.g., a response). In another example, the employee may use the LLM to obtain an answer to a question included in query 200 that may include the text "how do I log into the account management software" which may be used by the LLM to generate a response.

In order to provide the response to query 200 that meets the expectations of the user (e.g., the user may expect the response to include accurate information and/or the desired information content), contextual information may be obtained to be used by the inference model as context for generating the response. To obtain the contextual information, first relevant data identification process 206 may be performed. During first relevant data identification process 206, the contextual information may be attempted to be obtained (e.g., by the first personal agent) from a first data source (e.g., a first RAG repository) associated with the user (e.g., user's data repository 204). User's data repository 204 may be managed by the first personal agent, and may include first content ascribed a predetermined level of importance by the user (e.g., based on any criteria and/or schema for assigning levels of importance).

For example, user's data repository 204 may include entries such as documents, emails, presentations, recordings, templates, etc. which the user deems to be important and/or references (e.g., bookmarks) to information the user deems to be important. For example, if the user deems and email to be important, the user may add a copy of the email to user's data repository 204, and/or the user may add a reference to the email to user's data repository 204. The reference may then be used to retrieve information from the email (e.g., during a RAG pipeline process).

The user may add the entries to user's data repository 204 by providing instructions to their assigned personal agent. The instructions may include the information the user desires to be added, as well as a level of importance (e.g., based on a numerical scale and/or any other method for designating levels of importance). For example, the level of importance may be based on a schema and/or rule set for assigning a numerical value from 1-5 to entries in user's data repository 204, where a higher value indicates that an entry is more important.

Continuing the above example, the employee may use a first data source associated with the employee to store company sales reports and emails (e.g., from entities within the company, from other entities). The employee may add entries to the first data source by instructing their assigned personal agent to add content ascribed a level of importance by the employee to the first data source. For example, the employee may provide the instructions "save this email with a level 3 importance" (e.g., based on a scale of 1-10, where 10 indicates the highest level of importance) to their personal agent.

To attempt to obtain the contextual information as part of performing first relevant data identification process 206, query 200 may be analyzed to identify words and/or phrases which may require context in order to be interpreted as desired by the LLM. A search may then be performed in user's data repository 204 using the identified words and/or phrases as keywords for the search to identify any relevant entries which may be used to provide context to the identified words and/or phrases. For example, query 200 may include the text "summarize sales for last quarter." Based on the text, it may be identified that the word "sales" and the phrase "last quarter" require contextual information in order to obtain a desired response to query 200.

Information obtained from entries from user's data repository 204 that were identified during the search may be compared to criteria 202. Criteria 202 may be provided by a user, a management entity, a subject matter expert (SME), and/or any other entity participating in obtaining responses from inference models. Criteria 202 may include any number of thresholds, rule sets, and/or other means of determining whether an amount of contextual information obtained from user's data repository 204 is considered acceptable. For example, criteria 202 may include a level of enhancement threshold to allow query 200 to be serviced in a manner that is acceptable to the user. The level of enhancement threshold included in criteria 202 may include: (i) a threshold number and/or percentage of identified words and/or phrases for which contextual information was identified from user's data repository 204, and/or (ii) other thresholds.

If a quantity of the information obtained from the entries from user's data repository 204 meets a corresponding level of enhancement threshold of criteria 202, it may be concluded that the contextual information is able to be obtained from the first data source (e.g., user's data repository 204). Query 200 may then be serviced using the contextual information. Refer to the description of FIG. 2C for additional details regarding servicing query 200.

If a quantity of the information obtained from the entries from user's data repository 204 does not meet the corresponding level of enhancement threshold of criteria 202, it may be concluded that at least a first portion of the contextual information is unable to be obtained from the first data source. The at least the first portion of the contextual information may then be attempted to be obtained from other data sources associated with other users. Refer to the description of FIG. 2B for additional details regarding attempting to obtain the at least the first portion of the contextual information from the other data sources.

For example, an analysis of query 200 may identify 5 words for which contextual information is needed. A search may be performed in user's data repository 204, which may result in information being obtained for 4 of the 5 words. Criteria 202 may include a level of enhancement threshold that indicates information for 75% of the identified words must be obtained in order to service query 200. Therefore, in this example, a quantity of the information obtained from user's data repository 204 may meet the level of enhancement threshold, and thus, the information may meet criteria 202.

While described above with respect to a single quantity from the information obtained from the first data source being compared to a single corresponding threshold from the criteria, it will be appreciated that any number of quantities may be compared to any number of corresponding thresholds and/or any other types of rules may be applied to determine whether criteria 202 are met.

As a result of first relevant data identification process 206, result 208 may be obtained. Result 208 may include: (i) an indication of whether criteria 202 are met (e.g., a "yes" or "no" answer), (ii) portions of query 200 (e.g., identified words and/or phrases) for which sufficient contextual information was unable to be obtained, (iii) any information obtained from user's data repository 204 usable to provide context to portions of query 200, and/or (iv) other information.

Turning to FIG. 2B, a second data flow diagram in accordance with an embodiment is shown. The second data flow diagram may illustrate data used in and data processing performed, at least in part, in obtaining at least a first portion of contextual information for query 200 from other data sources associated with other users (e.g., users other than the user that provided query 200).

To attempt to obtain the at least the first portion of the contextual information, second relevant data identification process 210 may be performed. During second relevant data identification process 210, portions of query 200 for which sufficient contextual information was unable to be obtained may be identified from result 208 (e.g., a list of identified words and/or phrases for which contextual information was unable to be obtained from a first data source). The at least the first portion of the contextual information for the identified portions of query 200 may be attempted to be obtained (e.g., by a first personal agent assigned to the user) from data repositories 212.

Data repositories 212 may include any number of data repositories (e.g., 212A-212N) (e.g., RAG repositories) associated with other users and managed by personal agents assigned to the other users. For example, data repository 212A may be a second data source associated with a second user and managed by a second personal agent. Data repositories 212 may be used by the other users to store content similar to content stored in user's data repository 204 shown in FIG. 2A.

To attempt to obtain the at least the first portion of the contextual information, a subset of data repositories 212 may be identified that is likely to include information relevant to the user that provided query 200. By attempting to obtain the at least the first portion of the contextual information from data sources likely to be relevant to the user, a likelihood of obtaining a response to query 200 that meets the expectations of the user may be improved. For example, a first employee may work in the sales division of a company, and may use the phrase "first quarter" to refer to the first quarter of the fiscal year for the company (e.g., July 1$^{st}$ to September 30$^{th}$). A second employee may work in the product development division of the company, and may use the phrase "first quarter" to refer to the first quarter of the calendar year (e.g., January 1$^{st}$ to March 31$^{st}$). Thus, in order to obtain context for the phrase "first quarter" for a query obtained from the first employee, a search may be performed using data sources associated with other employees working in the sales division (and/or that have other characteristics similar to the first employee).

To obtain the subset of data repositories 212, at least one other user may be identified based on the user using user characteristics 214. User characteristics 214 may include: (i) first characteristics for the user, and/or (ii) characteristics for the other users. The first characteristics may include: (i) a job title for the user (e.g., a position of the user within a company), (ii) job duties for the user (e.g., roles and/or tasks performed by the user), (iii) a job division for the user (e.g., a department that the user is associated with within the company), (iv) a job ranking for the user (e.g., a level of experience for the user), (v) a geographic location for the user (e.g., a country), and/or (vi) other characteristics for the user. The characteristics for the other users may include similar information for each user of the other users. User characteristics 214 may be obtained from a characteristics database, repository, and/or other storage architecture that may be maintained, for example, by a company for employees of the company.

To identify the at least one other user, a user matching process may be performed as part of performing second relevant data identification process 210. During the user matching process, the first characteristics may be compared to the characteristics for the other users to identify the at least one other user having second characteristics that meet similarity criteria (not shown). Performing the user matching process may include performing any number and/or type of analysis processes using any similarity criteria (e.g., determined by the user, a management entity, a SME, and/or any other entity). For example, the similarity criteria may include a threshold number and/or percentage of the first characteristics which match characteristics of the at least one other user.

For example, a query including the text "instructions for using software" may be obtained from a new employee at a company by a first personal agent assigned to the new employee. The first characteristics for the new employee may indicate that the new employee is an engineer, responsible for writing technical reports and using software to create schematics, works in the product development division of the company, and is an entry-level employee. The first personal agent may attempt to obtain contextual information for the query from a first data source associated with the new employee. If the first personal agent is able to obtain the contextual information from the first data source, the first personal agent may use the contextual information to service the query. Refer to the description of FIG. 2C for additional details regarding servicing the query.

If the first personal agent determines that at least a first portion of the contextual information for servicing the query is unable to be obtained from the new employee's data source, the new employee's characteristics may be compared to characteristics of other employees at the company using a user matching process. Based on the user matching process, a second employee may be identified that has second characteristics. For example, the second characteristics may indicate that the second employee is an engineer, responsible for writing technical reports and using software to create schematics, works in the product development division of the company, and is a senior-level employee. The similarity criteria may indicate that at least 50% of the first characteristics must match the second characteristics to meet the similarity criteria; thus, in this example, the second characteristics may meet the similarity criteria and the second user may be identified as the at least one other user.

Upon identifying the at least one other user, the subset of data repositories 212 may be identified. For example, a second data source that is associated with the at least one other user may be identified (e.g., data repository 212A) that includes second content ascribed a predetermined level of importance by the at least one other user (e.g., data repository 212A may be used by the at least one other user to store information and a corresponding level of importance). The second data source may be managed by a second personal agent. Refer to the description of FIG. 2A for additional details regarding ascribing content a level of importance.

To attempt to obtain the at least the first portion of the contextual information from the second data source, the first personal agent may initiate interactions with the second personal agent. For example, the first personal agent may provide a request for information to the second personal agent (e.g., via a message using a communication channel). Upon obtaining the request, the second personal agent may perform a search in the second data source to identity the requested information. The second personal agent may provide a response to the first personal agent, including: (i) an indication regarding whether the requested information was able to be obtained (e.g., a "yes" or "no" answer), (ii) the requested information, and/or (iii) other information. The first personal agent may interact with any number of other personal agents associated with the identified subset of data repositories 212 to attempt to obtain the at least the first portion of the contextual information.

While described with respect to the second personal agent providing the information to the first personal agent upon receiving the request for the information, it will be appreciated that the second personal agent may deny the request for any number of reasons. For example, the request may include first characteristics for the user, and based on the first characteristics, the second personal agent may restrict access to the information by the first personal agent (e.g., based on a role-based access control (RBAC) rule set for data sharing). For example, the first characteristics may indicate that the user is an entry-level employee, and the requested information may be restricted to senior-level employees. In this example, the second personal agent may provide a response to the first personal agent indicating the request is denied.

Any information obtained from the other personal agents may be compared to criteria to determine whether sufficient contextual information has been obtained to allow query 200 to be serviced in a manner that is acceptable to the user. The criteria may be similar to criteria 202 shown in FIG. 2A (e.g., the criteria may include a similar and/or different level of enhancement threshold). Refer to FIG. 2A for additional details regarding comparing information to the criteria.

If the at least the first portion of the contextual information for query 200 is unable to be obtained from the second data source and/or other data sources of the identified subset of data repositories 212, query 200 may be provided to a second user that is likely to have a knowledge base usable to service query 200. The second user may be identified using user characteristics 214 (e.g., to identify the second user based on characteristics indicating the second user is likely to have the knowledge base), using a rule set for assigning users to service queries (e.g., a team leader associated with the user that provided query 200), and/or based on other associations with the user and/or query 200. The second user may service query 200 by providing a response to the user.

If the at least the first portion of the contextual information is able to be obtained from data repositories 212, relevant data 216 may be obtained. Relevant data 216 may include: (i) the at least the first portion of the contextual information and/or any information relevant to query 200 obtained from data repositories 212 as a result of performing second relevant data identification process 210, (ii) any other information obtained from the first data source associated with the user (e.g., from user's data repository 204, refer to FIG. 2A), and/or (iii) other information. Relevant data 216 may then be used to service query 200 using an inference model. Refer to the description of FIG. 2C for additional details regarding servicing query 200.

Turning to FIG. 2C, a third data flow diagram in accordance with an embodiment is shown. The third data flow diagram may illustrate data used in and data processing performed in servicing a query (e.g., query 200) by obtaining a response (e.g., response 228) to the query using an inference model (e.g., inference model 226).

To obtain response 228, ingest data package generation process 220 may be performed. During ingest data package generation process 220, query 200 and relevant data 216 (e.g., including the at least the first portion of the contextual information and the any other information obtained from user's data repository 204) may be compiled to obtain ingest data package 222. Ingest data package 222 may include a data structure indicating that relevant data 216 is to be used as context while generating a response to query 200 by an inference model. Therefore, the inference model may extract information from relevant data 216 included in ingest data package 222 and may base the response to query 200, at least in part, on the extracted information.

Ingest data package 222 may be a RAG output from a RAG pipeline process and may be usable as ingest for inference model 226. Inference model 226 may be a generative inference model (e.g., an LLM), and may include a neural network. Using ingest data package 222, response generation process 224 may be performed. During response generation process 224, generation of a response by inference model 226 may be initiated by feeding ingest data package 222 into inference model 226 to obtain response 228 as output from inference model 226.

Inference model 226 may generate response 228 to query 200 using relevant data 216 as context. Response 228 may include, for example, an answer to a question included in query 200, a desired information content indicated by query 200, and/or other information. Response 228 may include: (i) text, (ii) an image, (iii) a video, (iv) audio, and/or (v) other types of output that may be generated by inference model 226. Response 228 may be provided to the user (e.g., via the personal agent assigned to the user) as a customized service.

Thus, by implementing the data flows shown in FIGS. 2A-2C, a system in accordance with embodiments disclosed herein may have an increased likelihood of providing users responses to queries that meet the expectations of the users. Consequently, a resource cost (e.g., computational resources, time resources, cognitive resources) of obtaining the responses may be reduced.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1-2C may perform various methods to provide customized services to users of data processing systems. FIG. 3 illustrates a method that may be performed by the components of the system of FIGS. 1-2C. In the diagrams discussed below and shown in FIGS. 3, any of the operations may be repeated, performed in different orders, and/or performed in parallel with or in a partially overlapping in time manner with other operations.

Turning to FIG. 3, a flow diagram illustrating a method of providing customized services to users of data processing systems in accordance with an embodiment is shown. The method may be performed, for example, by any of the components of the system of FIG. 1, and/or any other entity without departing from embodiments disclosed herein.

At operation 300, a query may be obtained from a user of the users. Obtaining the query may include: (i) reading the query from storage, (ii) receiving the query from the user (e.g., via a message over a communication system, via a graphical user interface (GUI) on a device), (iii) receiving the query from another entity, (iv) generating the query (e.g., based on user input and/or instructions), and/or (v) other methods. The query may be obtained by a first personal agent assigned to the user.

At operation 302, contextual information for the query may be attempted to be obtained from a first data source associated with the user, the first data source including first content ascribed a predetermined level of importance by the user. Attempting to obtain the contextual information for the query from the first data source may include: (i) analyzing the query to identify words and/or phrases for which contextual information is to be obtained (e.g., via any analysis method performed by the first personal agent, inference model, and/or SME), (ii) performing a search in the first data source using the identified words and/or phrases as keywords for the search to identify entries in the first data source including information relevant to the query, (iii) extracting the information from the identified entries, (iv) comparing the information obtained from the first data source to criteria, the criteria including a level of enhancement threshold to allow the query to be serviced in a manner that is acceptable to the user, and/or (iv) other methods. Attempting to obtain the contextual information may also include providing a request for the contextual information to another entity.

Comparing the information obtained from the first data source to the criteria may include: (i) obtaining the criteria (e.g., from a SME, the user, a management entity, and/or any other entity), (ii) obtaining a quantity from the information (e.g., a number of words and/or phrases from the query for which information was obtained, a percentage of words and/or phrases from the query for which information was obtained), (iii) comparing the quantity obtained from the information to a quantity included in the criteria (e.g., a quantity indicated by the level of enhancement threshold such as a threshold number and/or percentage of words and/or phrases from the query for which information was obtained), and/or (iv) other methods. Comparing the information obtained from the first data source to the criteria may also include providing the information and/or the criteria to another entity responsible for comparing the information to the criteria.

Obtaining the criteria may include: (i) reading the criteria from storage, (ii) receiving the criteria from another entity (e.g., the user, the management entity, the SME), (iii) generating the criteria, and/or (iv) other methods.

If the information meets the criteria, it may be concluded that the contextual information is able to be obtained from the first data source. Concluding that the contextual information is able to be obtained from the first data source may include: (i) generating a data structure indicating that the contextual information is able to be obtained from the first data source, (ii) storing the data structure in a database and/or other storage architecture for retrieval by an entity responsible for servicing the query using the contextual information, (iii) notifying (e.g., via a message over a communication system, via a graphical user interface (GUI) on a device) another entity (e.g., the user, another personal agent) that the contextual information is able to be obtained from the first data source, and/or (iv) other methods.

If the information does not meet the criteria, it may be concluded that at least a first portion of the contextual information is unable to be obtained from the first data source. Concluding that the at least the first portion of the contextual information is unable to be obtained from the first data source may include: (i) generating a data structure indicating that the at least the first portion of the contextual information is unable to be obtained from the first data source, (ii) storing the data structure in a database and/or other storage architecture for retrieval by an entity responsible for obtaining the at least the first portion of the contextual information, (iii) notifying (e.g., via a message over a communication system, via a graphical user interface (GUI) on a device) another entity (e.g., the user, another personal agent) that the at least the first portion of the contextual information is unable to be obtained from the first data source, and/or (iv) other methods.

At operation 304, it may be determined whether at least the first portion of the contextual information is unable to be obtained from the first data source. Determining whether the at least the first portion of the contextual information is unable to be obtained from the first data source may include: (i) reading a result of the attempting to obtain the contextual information for the query from the first data source, (ii) receiving a notification from another entity indicating that the at least the first portion of the contextual information is unable to be obtained from the first data source, and/or (iii) other methods.

If it is determined that the at least the first portion of the contextual information is unable to be obtained from the first data source (e.g., the determination is "Yes" at operation 304), then the method may proceed to operation 306.

At operation 306, at least one other user may be identified based on the user. Identifying the at least one other user may include: (i) obtaining first characteristics for the user, (ii) performing, using the first characteristics and similarity criteria, a user matching process to identify the at least one other user, the at least one other user having second characteristics that meet the similarity criteria, and/or (iii) other methods. Identifying the at least one other user may also include providing a request for the at least the one other user to another entity and receiving an identification of the at least one other user (e.g., a name and/or other identifier for the at least one other user) in response.

Obtaining the first characteristics for the user may include: (i) prompting the user to provide the first characteristics (e.g., via an interaction on a GUI), (ii) reading the first characteristics from storage (e.g., from a user characteristics database and/or other storage architecture), (iii) receiving the first characteristics from another entity, (iv) compiling the first characteristics from publicly available and/or internally available data sources, and/or (v) other methods.

Performing the user matching process may include: (i) performing a lookup process in a database (e.g., including identifiers for users and user characteristics for the users) using the first characteristics as a key for a lookup table included in the database, (ii) obtaining, as a result of the lookup process, a list of users and corresponding user characteristics for the users, (iii) obtaining similarity criteria (e.g., reading the similarity criteria from storage, receiving the similarity criteria from another entity, generating the similarity criteria), (iv) comparing the user characteristics for the users to the similarity criteria, (v) providing the first characteristics to another entity responsible for performing the user matching process, and/or (vi) other methods.

Comparing the user characteristics for the users to the similarity criteria may include: (i) obtaining a quantity of user characteristics for each of the users that match the first characteristics, (ii) comparing the quantity of matching characteristics for each of the users to a quantity included in the similarity criteria (e.g., a threshold number and/or percentage of matching characteristics) to identify the at least one other user having second characteristics that meet the similarity criteria, (iv) providing the user characteristics for the users to another entity responsible for comparing the user characteristics to the similarity criteria, and/or (v) other methods.

At operation 308, a second data source associated with the at least one other user may be identified, the second data source including second data content ascribed the predetermined level of importance by the at least one other user. Identifying the second data source may include: (i) performing a lookup process in a lookup table using an identifier for the at least one other user as a key for the lookup table, (ii) obtaining, as a result of the lookup process, a data structure identifying the second data source, (iii) reading the data structure identifying the second data source from storage, (iv) receiving the data structure identifying the second data source from another entity, and/or (v) other methods. The second data source may be managed by a second personal agent assigned to the at least one other user.

At operation 310, the at least the first portion of the contextual information for the query may be attempted to be obtained from the second data source based on the at least the first portion of the contextual information. Attempting to obtain the at least the first portion of the contextual information may include: (i) initiating interactions, by the first personal agent, with the second personal agent to attempt to obtain the at least the first portion of the contextual information (e.g., providing a request for the at least the first portion of the contextual information to the second personal agent via a message and/or via other methods), (ii) receiving a response from the second personal agent, (iii) providing a request for the at least the first portion of the contextual information to another entity, and/or (iv) other methods.

If the at least the first portion of the contextual information is able to be obtained from the second data source (e.g., the response from the second personal agent includes the at least the first portion of the contextual information), the method may proceed to operation 312.

If the at least the first portion of the contextual information is unable to be obtained from the second data source (e.g., the response from the second personal agent does not include the at least the first portion of the contextual information), the query may be provided to a second user that is likely to have a knowledge base usable to service the query. Providing the query to the second user may include: (i) identifying the second user that is likely to have the knowledge base (e.g., based on user characteristics for the second user, based on a schema for providing queries to be serviced by users), (ii) transmitting the query to the second user (e.g., via a message), (iii) storing the query in storage followed by retrieval of the query by the second user, and/or (iv) other methods.

At operation 312, the query may be serviced using the at least the first portion of the contextual information and any other information obtained from the first data source during the attempting to obtain the contextual information for the query from the first data source. Servicing the query may include: (i) obtaining, using the query, the at least the first portion of the contextual information, and the any other information, an ingest data package for the inference model, (ii) initiating generation of the response by the inference model using the ingest data package, (iii) providing the response to the user as a customized service (e.g., transmitting the response to the user via a message, storing the response in storage for subsequent retrieval by the user), and/or (iv) other methods.

Obtaining the ingest data package may include: (i) generating the ingest data package (e.g., compiling the query, the at least the first portion of the contextual information, and the any other information into a data structure), (ii) providing the query, the at least the first portion of the contextual information, and the any other information to another entity responsible for generating the ingest data package for the inference model, and/or (iii) other methods.

Initiating generation of the response by the inference model may include: (i) providing the ingest data package to an entity responsible for hosting and operating the inference model, (ii) feeding the ingest data package into the inference model and obtaining the response as output from the inference model, and/or (iii) other methods.

The method may end following operation 312.

Returning to operation 304, if it is determined that the at least the first portion of the contextual information is able to be obtained from the first data source (e.g., the determination is "No" at operation 304), then the method may proceed to operation 314.

At operation 314, the query may be serviced using the contextual information obtained from the first data source. Servicing the query using the contextual information may include methods similar to those described with respect to operation 312.

The method may end following operation 314.

Thus, as illustrated above, embodiments disclosed herein may provide systems and methods usable to provide customized services to users of data processing systems so that responses to queries from the users have an increased likelihood of meeting the expectations of the users while conserving limited resources.

Figure 4:
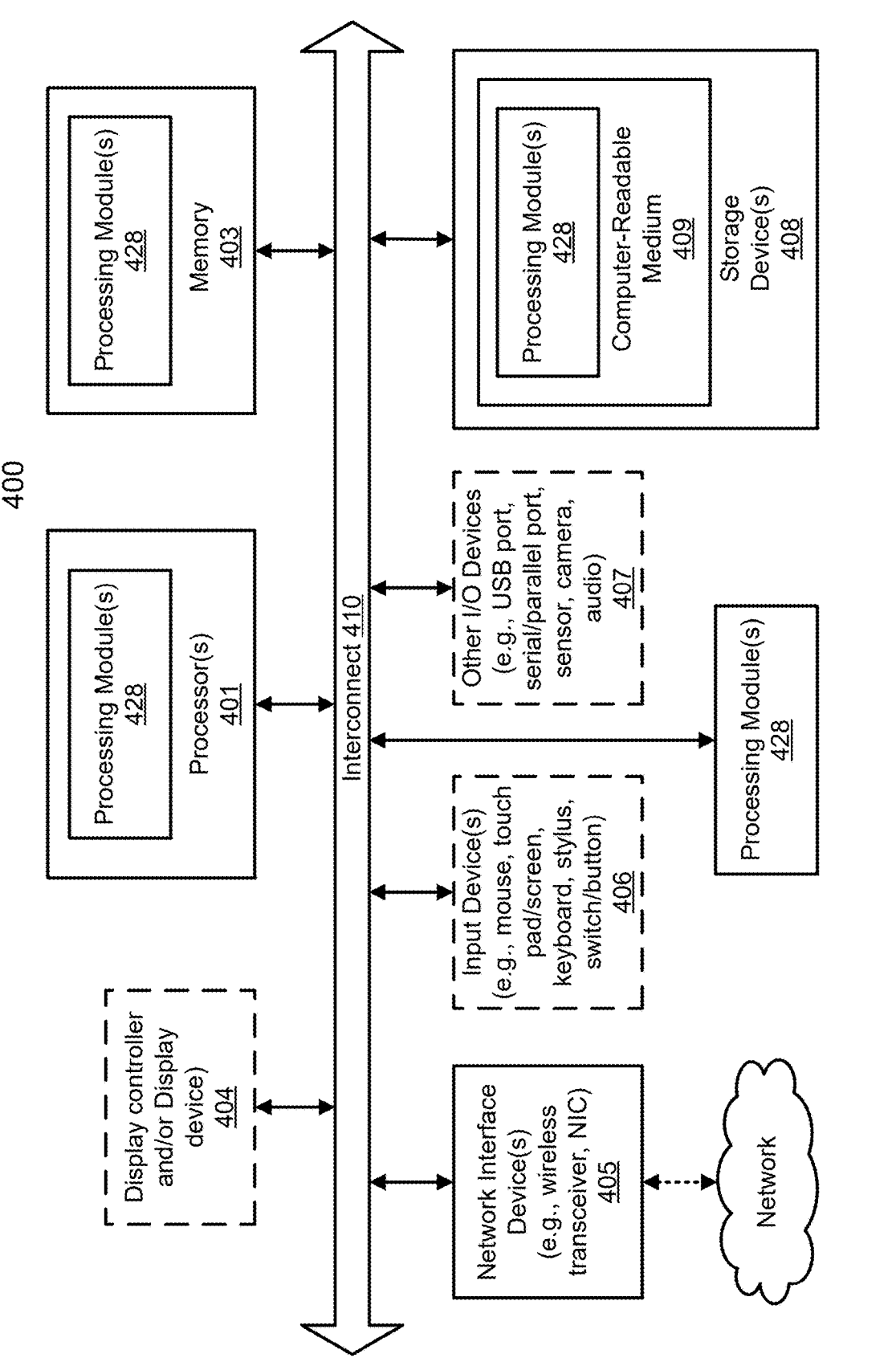
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing customized services to users of data processing systems, the method comprising:

obtaining a query from a user of the users;

attempting, based on the query, to obtain contextual information for the query from a first data source associated with the user, the first data source comprising first content ascribed a predetermined level of importance by the user;

in a first instance of the attempting where at least a first portion of the contextual information is unable to be obtained from the first data source:

identifying at least one other user based on the user;

identifying a second data source associated with the at least one other user, the second data source comprising second content ascribed the predetermined level of the importance by the at least one other user;

attempting, based on the at least the first portion of the contextual information, to obtain the at least the first portion of the contextual information for the query from the second data source; and servicing the query using the at least the first portion of the contextual information and any other information obtained from the first data source during the attempting to obtain the contextual information for the query from the first data source.

2. The method of claim 1, wherein attempting to obtain the contextual information for the query from the first data source comprises:

comparing information obtained from the first data source to criteria, the criteria comprising a level of enhancement threshold to allow the query to be serviced in a manner that is acceptable to the user;

in a first instance of the comparing in which the information meets the criteria:

concluding that the contextual information is able to be obtained from the first data source;

servicing the query using the contextual information; and in a second instance of the comparing in which the information does not meet the criteria:

concluding that the at least the first portion of the contextual information is unable to be obtained from the first data source.

3. The method of claim 1, wherein identifying the at least one other user based on the user comprises:

obtaining first characteristics for the user; and performing, using the first characteristics and similarity criteria, a user matching process to identify the at least one other user, the at least one other user having second characteristics that meet the similarity criteria.

4. The method of claim 3, wherein the first characteristics comprise at least one type of characteristic selected from a list of types of characteristics consisting of:

a job title for the user;

job duties for the user;

a job division for the user; and a job ranking for the user.

5. The method of claim 1, wherein the first data source is managed by a first personal agent assigned to the user, and the second data source is managed by a second personal agent assigned to the at least one other user.

6. The method of claim 5, wherein attempting to obtain the at least the first portion of the contextual information for the query from the second data source comprises:

initiating interactions, by the first personal agent, with the second personal agent to attempt to obtain the at least the first portion of the contextual information; and in an instance of the attempting to obtain the at least the first portion of the contextual information for the query from the second data source in which the at least the first portion of the contextual information is unable to be obtained from the second data source:

providing the query to a second user that is likely to have a knowledge base usable to service the query.

7. The method of claim 1, wherein servicing the query comprises:

obtaining, using the query, the at least the first portion of the contextual information, and the any other information, an ingest data package for an inference model;

initiating generation of a response by the inference model using the ingest data package; and providing the response to the user as a customized service.

8. The method of claim 7, wherein the ingest data package is a retrieval-augmented generation (RAG) output from a RAG pipeline process, and the inference model is a large language model (LLM).

9. A non-transitory machine-readable medium having instructions stored therein, which when executed by a processor, cause the processor to perform operations for providing customized services to users of data processing systems, the operations comprising:

obtaining a query from a user of the users;

attempting, based on the query, to obtain contextual information for the query from a first data source associated with the user, the first data source comprising first content ascribed a predetermined level of importance by the user;

in a first instance of the attempting where at least a first portion of the contextual information is unable to be obtained from the first data source:

identifying at least one other user based on the user;

identifying a second data source associated with the at least one other user, the second data source comprising second content ascribed the predetermined level of the importance by the at least one other user;

attempting, based on the at least the first portion of the contextual information, to obtain the at least the first portion of the contextual information for the query from the second data source; and servicing the query using the at least the first portion of the contextual information and any other information obtained from the first data source during the attempting to obtain the contextual information for the query from the first data source.

10. The non-transitory machine-readable medium of claim 9, wherein attempting to obtain the contextual information for the query from the first data source comprises:

comparing information obtained from the first data source to criteria, the criteria comprising a level of enhancement threshold to allow the query to be serviced in a manner that is acceptable to the user;

in a first instance of the comparing in which the information meets the criteria:

concluding that the contextual information is able to be obtained from the first data source;

servicing the query using the contextual information; and in a second instance of the comparing in which the information does not meet the criteria:

concluding that the at least the first portion of the contextual information is unable to be obtained from the first data source.

11. The non-transitory machine-readable medium of claim 9, wherein identifying the at least one other user based on the user comprises:

obtaining first characteristics for the user; and performing, using the first characteristics and similarity criteria, a user matching process to identify the at least one other user, the at least one other user having second characteristics that meet the similarity criteria.

12. The non-transitory machine-readable medium of claim 11, wherein the first characteristics comprise at least one type of characteristic selected from a list of types of characteristics consisting of:

a job title for the user;

job duties for the user;

a job division for the user; and a job ranking for the user.

13. The non-transitory machine-readable medium of claim 9, wherein the first data source is managed by a first personal agent assigned to the user, and the second data source is managed by a second personal agent assigned to the at least one other user.

14. The non-transitory machine-readable medium of claim 13, wherein attempting to obtain the at least the first portion of the contextual information for the query from the second data source comprises:

initiating interactions, by the first personal agent, with the second personal agent to attempt to obtain the at least the first portion of the contextual information; and in an instance of the attempting to obtain the at least the first portion of the contextual information for the query from the second data source in which the at least the first portion of the contextual information is unable to be obtained from the second data source:

providing the query to a second user that is likely to have a knowledge base usable to service the query.

15. A data processing system, comprising:

a processor; and a memory coupled to the processor to store instructions, which when executed by the processor, cause the processor to perform operations for providing customized services to users of data processing systems, the operations comprising:

obtaining a query from a user of the users;

attempting, based on the query, to obtain contextual information for the query from a first data source associated with the user, the first data source comprising first content ascribed a predetermined level of importance by the user;

in a first instance of the attempting where at least a first portion of the contextual information is unable to be obtained from the first data source:

identifying at least one other user based on the user;

identifying a second data source associated with the at least one other user, the second data source comprising second content ascribed the predetermined level of the importance by the at least one other user;

attempting, based on the at least the first portion of the contextual information, to obtain the at least the first portion of the contextual information for the query from the second data source; and servicing the query using the at least the first portion of the contextual information and any other information obtained from the first data source during the attempting to obtain the contextual information for the query from the first data source.

16. The data processing system of claim 15, wherein attempting to obtain the contextual information for the query from the first data source comprises:

comparing information obtained from the first data source to criteria, the criteria comprising a level of enhancement threshold to allow the query to be serviced in a manner that is acceptable to the user;

in a first instance of the comparing in which the information meets the criteria:

concluding that the contextual information is able to be obtained from the first data source;

servicing the query using the contextual information; and in a second instance of the comparing in which the information does not meet the criteria:

concluding that the at least the first portion of the contextual information is unable to be obtained from the first data source.

17. The data processing system of claim 15, wherein identifying the at least one other user based on the user comprises:

obtaining first characteristics for the user; and performing, using the first characteristics and similarity criteria, a user matching process to identify the at least one other user, the at least one other user having second characteristics that meet the similarity criteria.

18. The data processing system of claim 17, wherein the first characteristics comprise at least one type of characteristic selected from a list of types of characteristics consisting of:

a job title for the user;

job duties for the user;

a job division for the user; and a job ranking for the user.

19. The data processing system of claim 15, wherein the first data source is managed by a first personal agent assigned to the user, and the second data source is managed by a second personal agent assigned to the at least one other user.

20. The data processing system of claim 19, wherein attempting to obtain the at least the first portion of the contextual information for the query from the second data source comprises:

initiating interactions, by the first personal agent, with the second personal agent to attempt to obtain the at least the first portion of the contextual information; and in an instance of the attempting to obtain the at least the first portion of the contextual information for the query from the second data source in which the at least the first portion of the contextual information is unable to be obtained from the second data source:

providing the query to a second user that is likely to have a knowledge base usable to service the query.

* * * * *